United States Patent
Meyer et al.

[15] 3,636,686
[45] Jan. 25, 1972

[54] SAFETY FLAP ARRANGEMENT FOR DISCHARGE APERTURES IN ROTARY LAWNMOWER BASEPLATES

[72] Inventors: Dolph Allan Meyer; Ross Leslie Phelps; David Paul Seidel; Edward Henry Sykes; Ian Sweet Clipsham; Donald Gray; Theodore Demetrius Ractivand, all of Milperra, New South Wales, Australia

[73] Assignee: Victa Limited, Milperra, New South Wales, Australia

[22] Filed: Sept. 9, 1970

[21] Appl. No.: 70,779

[30] Foreign Application Priority Data

Apr. 8, 1970 Australia ...........................PA0845/70

[52] U.S. Cl. ..............................................56/320.2, 56/194
[51] Int. Cl. ......................................................A01d 55/18
[58] Field of Search................56/320.2, 194, 202, 203, 13.3, 56/13.4, 16.7, 17.1, 17.2, 17.3, 17.4, 17.5

[56] References Cited

UNITED STATES PATENTS

| | | | |
|---|---|---|---|
| 3,065,588 | 11/1962 | Shaw | 56/13.4 |
| 3,186,152 | 6/1965 | Epstein | 56/202 |
| 3,420,041 | 1/1969 | Irgens | 56/320.2 |

FOREIGN PATENTS OR APPLICATIONS

| | | | |
|---|---|---|---|
| 402,989 | 4/1967 | Australia | 56/194 |

*Primary Examiner*—Russell R. Kinsey
*Attorney*—Waters, Roditi, Schwartz & Nissen

[57] ABSTRACT

A pivoted flap arrangement for covering the grass discharge opening in a rotary lawnmower, and comprising a cover plate, a pivoted handle on the baseplate for opening the plate, a flexed spring leaf interconnecting the plate and the handle, and an overcenter (or toggle) action between the spring and the handle whereby resilient opening force is applied to the plate when the handle is operated and when the plate has pivoted to a fully open position the handle and plate are automatically returned.

10 Claims, 3 Drawing Figures

SAFETY FLAP ARRANGEMENT FOR DISCHARGE APERTURES IN ROTARY LAWNMOWER BASEPLATES

This invention relates to safety flaps for rotary lawnmower baseplates and more particularly to those which cover the discharge aperture thereof whenever a grasscatching receptacle on the baseplate is removed.

It is the main object of the invention to provide a cover flap arrangement for such apertures which will to a high degree safeguard an operator or bystander against injury.

The invention, therefore, in one general form is a safety flap arrangement for covering a grass discharge aperture in a rotary lawnmower baseplate, said arrangement comprising a plate member hinged to the baseplate for gravitational closure, a pivoted control lever for manual operation to raise the plate, and resilient means connected between the lever and the plate so as to be flexed by operation of the lever to draw the plate member to a fully open condition and then to effect automatic return of the lever for release of the plate member.

A preferred form of the invention is illustrated in the accompanying drawings, in which.

Figure 1:
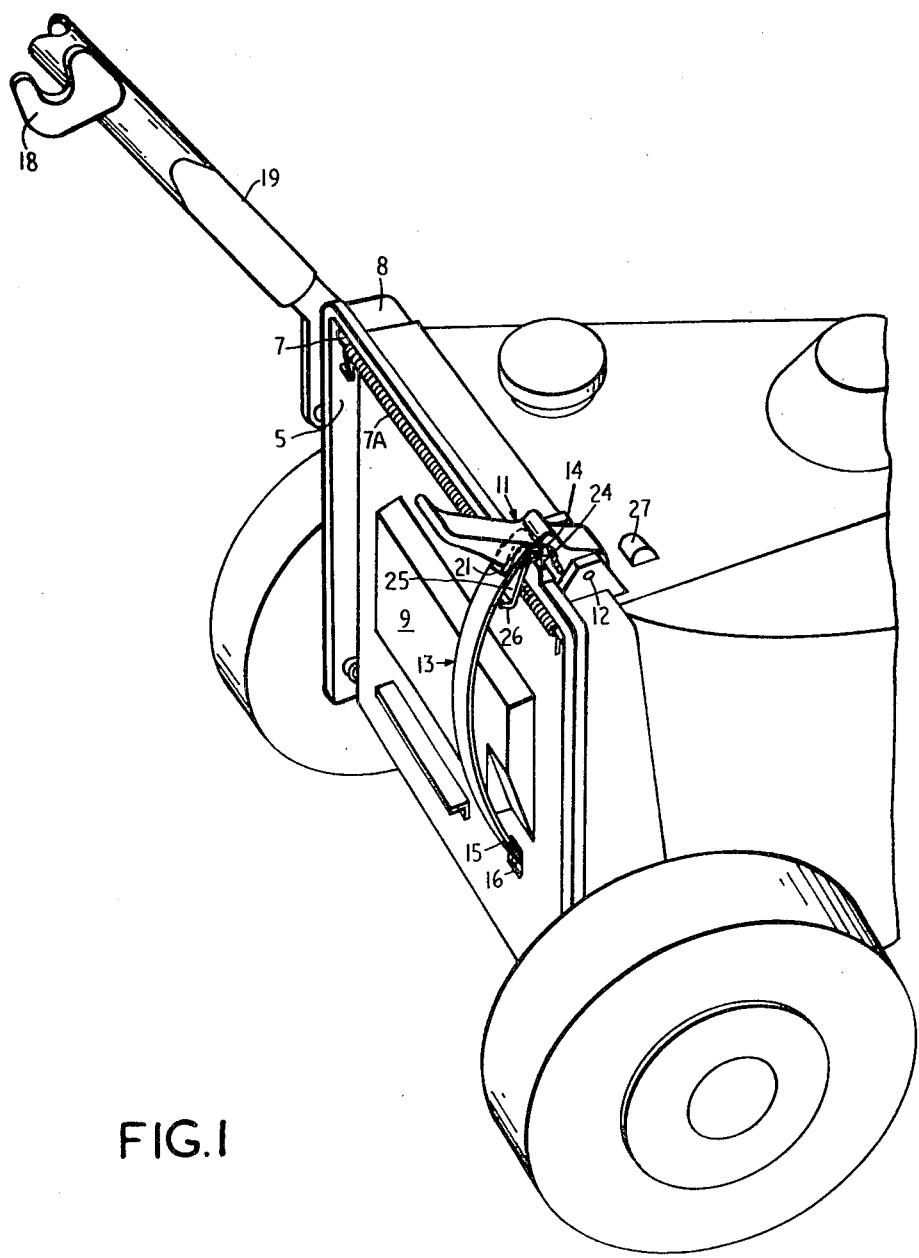
FIG. 1 is a fragmentary perspective view of the rear end of a rotary lawnmower showing a back safety flap thereon in a closed position.

With reference to the drawings, the backflap 4 is adapted to close a rectangular grass cuttings discharge port 5 in the baseplate of a rotary-type lawnmower which normally carries a grasscatcher 6 attached to the discharge port 5. The flap 4 is a relatively heavy metal plate hingedly secured to a transverse rod 7 mounted near the top 8 of the port 5. The flap is provided with stiffening deformations 9 and integral side flaps 10.

An actuating lever 11 is pivotally secured at 12 between trunnions formed integrally with the top 8 of the housing which defines the discharge port 5. An arcuately curved spring strip 13 is pivotally mounted at one end to a pin 14 medially positioned in wings of the lever 11. The spring strip 13 is formed from a bowed leaf of spring steel partly straightened in assembly so that its two ends tend to draw together.

Figure 2:
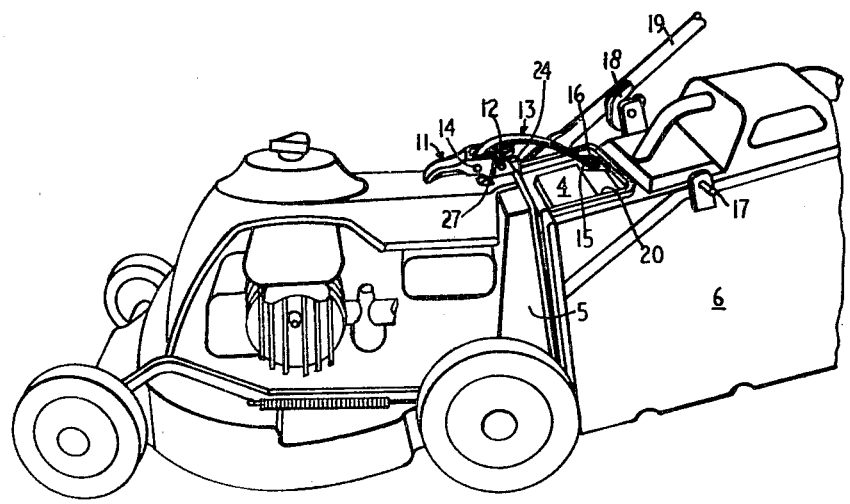
FIG. 2 is a perspective view of the opposite side of the lawnmower to that shown in FIG. 1, showing a grasscatcher attached and the backflap in an open or raised position.

The lever 11 is provided with a stop 21 outwardly of the pin 14 to engage the spring strip 13 and limit its pivoting movement. Spacing between stop 21 and spring 13 is such as to impose an additional force on the spring 13 at and near the closed position of the flap 4 to assist in forcibly holding the flap closed. In effect the action of the stop 21 is to reverse the direction of the line of force normally applied by the spring 13 when the flap approaches its closed position so as to provide the main shutting force for the flap 4. A torsion spring 7A is provided on rod 7 to permit an even larger shutting force in the flap 4. The other free end of the strip 13 is anchored at 15 in an aperture 16 in the flap 4. When the catcher 6 is removed from the mower the flap will be in the lowered and closed position, as shown in FIG. 1. The catcher 6 can be secured to the mower by engaging pins 17 on said catcher with hooks 18 on the mower handle 19. The actuating lever 11 can be swung over towards the front of the mower, as shown in FIG. 2, so that the flap 4 is pulled upwardly by tension in the spring strip 13. The flap 4 will now close an aperture 20 on the top of the catcher 6 and open the discharge port 5 at the rear of the mower. Grass cuttings will now be fed into the catcher 6 as mowing operations are carried out. Projecting tongues 22 on the grasscatcher 6 and 23 on the flap 4, or other suitable means, may be employed for interlocking purposes requiring depression of the flap 4 for release of the grasscatcher 6, while serving otherwise to hold the grasscatcher 6 on the lawnmower.

Opening of the flap may frequently be impeded, due to sticking, clogging or the like, and to ensure efficient operation under all conditions an auxiliary leverage device is incorporated. This consists of a fixed peaked projection 24 on the baseplate between the trunnions and beneath the lever 11 in the latter's normal position. The spring strip 13 has an extending end portion folded back upon itself around the pin 14 to form an auxiliary leaf spring 25 with an inturned tongue 26 at its end adapted to bear upon the underside of the spring strip 13. With operating movement of the actuating lever 11, therefore, the auxiliary spring 25 will be carried over to contact and "rub" upon the projection 24. With continued operating movement of lever 11 leverage will be exerted upon the flap 4, via contact of the tongue 26 with spring strip 13, about the fulcrum of the fixed projection 24. After the flap 4 has opened and is pivotting freely further operating movement of lever 11 may cause the end of the auxiliary spring 25 to pass over and beyond the peak of the projection 24. In the fully operated condition of lever 11 it abuts a stop pad 27 on the top of the baseplate for precise positioning. In this position and with the grasscatcher attached to the lawnmower the flap 4 will be locked to the grasscatcher by tongues 22 and 23 with the spring strip 13 spaced above the peak of the fixed projection 24. The flap 4 if depressed for unlocking of the grasscatcher may flex the spring strip 13 over the projection 24 but due to an overcenter alignment of the pin 14, projection peak and anchoring point 15, the lever 11 is not pulled back.

Figure 3:
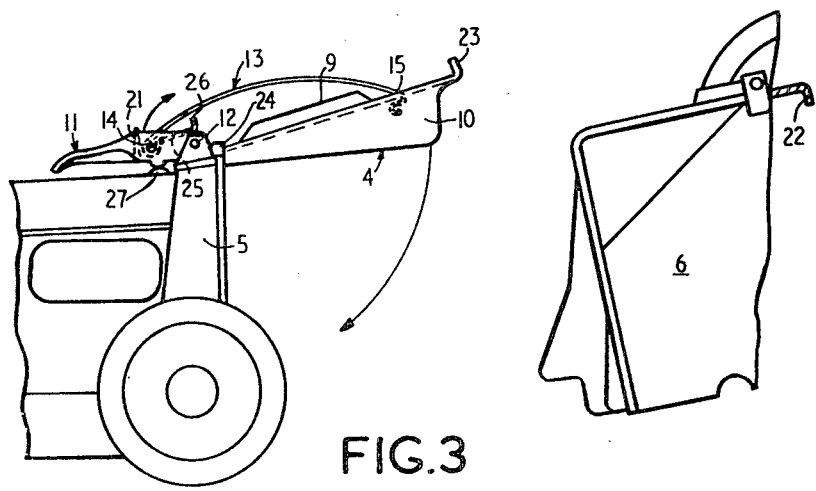
FIG. 3 is a side elevation showing the grasscatcher removed from the lawnmower and the backflap in the act of flying upwardly before it commences to drop and carry the actuating lever over with it.

Hence as soon as the catcher 6 is full, it may be removed without stopping the mower. When the catcher 6 is clear, as shown in FIG. 3, the tension in the spring strip 13 will first draw the flap 4 up to a higher elevation than it occupied when the catcher 6 was in place. In this position then the anchor point 15 of the spring strip 13 passes to the upper side of the alignment of the projection's peak and pin 14 and serves to unlock the lever 11 for return to normal. The weight of the flap 4 assisted by tension in the torsion spring 7A will now pull the lever 11 over towards the rear of the mower and the flap will be released and be returned to the closed position as shown in FIG. 1. Residual tension in the spring strip 13 abutted against stop 21 on the lever applies a force acting between anchorage 15 and pivot 12. This force, augmented to a degree by the force supplied by the torsion spring 7A in this position will keep the flap 4 shut against the action of the air blast from the mower blades and also against the impact with said flap of any objects thrown off by the rotating blades.

The flap-actuating lever 11 is located high on the top of the mower rear discharge port 5 so that an operator does not have to stoop down to move said lever. The spring 13 and lever arrangement is compact, simple and inexpensive to manufacture. It is especially resistant to sticking from accumulation of dust and grit. The force required to move the lever 11 is small due to the relatively great distance through which said lever is capable of moving.

It will be seen that a great measure of safety is provided by the cover flap arrangement of the invention. At all times when the grasscatcher 6 is not attached the discharge port 5 is closed by the flap 4. Furthermore, the catcher 6 may be placed in position on the lawnmower before the flap 4 is opened, and opening is effected without the operator having to reach inside the catcher. Also, the feature of automatic closure of the flap 4 ensures that the flap is permitted to start its closing sequence only after the last portion of the grasscatcher has released it, thus avoiding grass accumulated near the entry to the catcher being swept away by the flap as it closes.

What we claim is:

1. A safety flap arrangement for covering a grass discharge aperture in a rotary lawnmower baseplate, said arrangement comprising a plate member hinged to the baseplate for movement between open and closed conditions, a pivoted control lever for manual operation to move the plate from its closed condition, and resilient means connected between the lever and the plate so as to be flexed by operation of the lever to draw the plate member to its open condition and to effect automatic return of the lever to restore the plate member to its closed condition.

2. A safety flap arrangement according to claim 1, wherein the lever is pivoted by one end to the baseplate above the discharge aperture and closing of the plate is effected at least partly by gravitational force.

3. A safety flap arrangement according to claim 2, wherein the resilient means is elongated and pivotally fixed by one end to an intermediate position on the lever.

4. A safety flap arrangement according to claim 3, wherein the plate member is constructed to engage with a grasscatcher fitted to the lawnmower to be arrested in its opening movement short of a fully opened condition, and wherein in said arrested position the relationship of the lever pivot and the resilient means pivot on the lever to the anchoring point of the resilient means on the plate member is such as to create an overcenter action locking the lever in an operated position.

5. A safety flap arrangement according to claim 4, wherein in said fully open condition of the plate member the anchoring point of the resilient means passes beyond an alignment with the lever pivot and the resilient means pivot on the lever to unlock said lever and allow its automatic return.

6. A safety flap arrangement according to claim 1, wherein the resilient means is a spring strip the tension in which tends to bow it to reduce the spacing between its ends.

7. A safety flap arrangement for a grass discharge orifice on a baseplate of a rotary lawnmower, said arrangement comprising a cover plate pivotally movable between fully open and closed conditions, a manually operable control lever pivoted to the baseplate, resilient means between the plate and the baseplate urging the cover plate to the closed condition, a bowed spring leaf whose ends are forced apart for connection between the lever and the cover plate, and an overcenter disposition of the connecting points of the lever to the baseplate and the bowed spring to both the cover plate and the lever whereby the lever is locked in its operated position until the cover plate nears its fully open condition to draw the lever from its operated position thus removing an opening force on the cover plate.

8. A safety flap arrangement according to claim 8, wherein an auxiliary spring is carried by the lever and a projection is fixed upon the baseplate for engagement by the auxiliary spring during operation of the lever to cause the auxiliary spring to contact said bowed spring and to prize the cover plate from its closed condition if it should bind.

9. A safety flap arrangement according to claim 8, wherein the auxiliary spring is an end portion of said resilient means folded back upon itself and provided with an inturned engagement tongue.

10. A safety flap arrangement according to claim 7, wherein an abutment is provided upon the lever to engage the bowed spring when the lever is unoperated to exert a force upon the cover plate tending to hold it closed.

* * * * *